UNITED STATES PATENT OFFICE.

DAVID W. STAPLES, OF QUANAH, TEXAS.

INSECTICIDE.

SPECIFICATION forming part of Letters Patent No. 456,602, dated July 28, 1891.

Application filed January 15, 1891. Serial No. 377,792. (No specimens.)

*To all whom it may concern:*

Be it known that I, DAVID W. STAPLES, a citizen of the United States, residing at Quanah, in the county of Hardeman and State of Texas, have invented certain new and useful Improvements in Poisons for Prairie-Dogs; and I do hereby declare the following to be a full, clear, and exact description of the invention, such as will enable others skilled in the art to which it appertains to make and use the same.

This invention relates to chemical compositions adapted to destroy vermin, and more particularly prairie-dogs; but it may also be used to destroy many other sorts of vermin, including birds and insects.

This invention consists in the novel combination of the ingredients mixed and compounded, as hereinafter fully described and claimed.

The composition is made of the following ingredients: four and one-half ounces of powdered strychnia, three ounces of cyanide of potassium, three ounces of green coffee-berries, six ounces of alcohol, the whites of four eggs, half a gallon of sirup made of light sugar and water mixed as thick as possible, one hundred and forty pounds of clean wheat, and fourteen pounds of cornmeal. In order to obtain the best results, these ingredients are mixed and compounded in the following manner: first, the coffee and eggs are mixed together, and the mixture is allowed to stand for fourteen hours; second, the strychnia and alcohol are mixed together, and the mixture is allowed to stand for from five to six hours; third, the cyanide of potassium is dissolved in one quart of hot water, and the mixture is allowed to cool; fourth, the mixture of coffee and eggs is then mixed with the cyanide of potassium and water, and the whole is well stirred and strained through a gunny-sack; fifth, the sirup is then added to the last mixture; sixth, the mixture of strychnia and alcohol is then added to the other ingredients and the whole is well stirred, and may be put up in tightly-corked bottles if not wanted for immediate use.

The above-stated amounts of ingredients are to be mixed with one hundred and forty pounds of clean wheat and fourteen pounds of cornmeal. The mixture is first stirred into the wheat, and then the cornmeal is added and the whole is well stirred again. The composition is then ready for immediate use, and should be placed where the vermin may have access to it.

To destroy prairie-dogs, the composition should be placed close to their holes; but it is better not to place it in the holes.

The green coffee-berries which are mixed with the poisons attract the prairie-dogs and induce them to eat the sweetened food with which the poisons are compounded, and the whites of eggs aid in extracting the flavor of the coffee and in spreading it through the composition.

The exact proportions of the ingredients may be varied without effecting a material change; but the above-given proportions are the best, and the method of mixing them should be carefully followed.

What I claim is—

A poison for prairie-dogs, consisting of strychnia, cyanide of potassium, green coffee-berries, and whites of eggs, saccharine matter, and food, substantially as and in the proportions set forth.

In testimony whereof I affix my signature in presence of two witnesses.

DAVID W. STAPLES.

Witnesses:
S. M. JAMES,
I. E. JAMES.